(12) United States Patent  (10) Patent No.: US 6,735,981 B2
Collins et al.  (45) Date of Patent: May 18, 2004

(54) HIGH HEAT CAPACITY BURNERS FOR PRODUCING FUSED SILICA BOULES

(75) Inventors: Thomas A. Collins, Horseheads, NY (US); Chunhong He, Horseheads, NY (US); Christine E. Heckle, Horseheads, NY (US); Raymond E. Lindner, Corning, NY (US); Michael H. Wasilewski, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 10/255,723

(22) Filed: Sep. 25, 2002

(65) Prior Publication Data

US 2003/0056538 A1 Mar. 27, 2003

Related U.S. Application Data

(60) Provisional application No. 60/325,952, filed on Sep. 27, 2001.

(51) Int. Cl.$^7$ ................................. C03B 19/06
(52) U.S. Cl. .............. 65/17.4; 65/531; 65/413; 65/414; 65/415; 65/416; 431/127; 431/128; 431/129; 431/153; 431/177; 431/195; 239/270
(58) Field of Search ............ 65/17.4, 531, 413, 65/414, 415, 416; 431/127, 128, 129, 153, 177, 195–198; 239/270; 423/335–337

(56) References Cited

U.S. PATENT DOCUMENTS

| 4,826,520 A | * | 5/1989 | Kawazoe et al. ............ 65/414 |
| 5,599,371 A | * | 2/1997 | Cain et al. .................... 65/413 |
| 5,702,495 A | * | 12/1997 | Hiraiwa et al. ............. 65/17.1 |
| 5,922,100 A | * | 7/1999 | Cain et al. .................... 65/531 |
| 6,260,358 B1 | * | 7/2001 | Daudel et al. ................ 60/602 |

FOREIGN PATENT DOCUMENTS

| WO | WO 99/20574 | 4/1999 |
| WO | WO 00/17115 | 3/2000 |
| WO | WO 02/22513 | 3/2002 |

* cited by examiner

Primary Examiner—Steven P. Griffin
Assistant Examiner—Mark Halpern
(74) Attorney, Agent, or Firm—Timothy M. Schaeberle

(57) ABSTRACT

Burners and methods for producing fused silica members. The burner includes seven gas-emitting regions, including four regions for emitting a mixture of oxygen and combustible gas.

10 Claims, 3 Drawing Sheets

HIGH HEAT CAPACITY BURNERS FOR PRODUCING FUSED SILICA BOULES

CROSS REFERENCE TO RELATED APPLICATION

This application claims the benefit of U.S. Provisional Application U.S. Serial No. 60/325,952, filed Sep. 27, 2001 entitled High Heat Capacity Burners for Producing Fused Silica Boules.

FIELD OF THE INVENTION

This invention relates to methods and apparatus for the production of fused silica optical members. More particularly, the invention relates to methods, burners and furnaces incorporating burners for the production of high purity fused silica.

BACKGROUND OF THE INVENTION

As practiced commercially, fused silica optical members such as lenses, prisms, photomasks and windows, are typically manufactured from bulk pieces of fused silica made in large production furnaces. In overview, silicon-containing gas molecules are reacted in a flame to form silica soot particles. The soot particles are deposited on the hot surface such as a layer of bait sand of a rotating or oscillating body where they consolidate into to the glassy solid state. In the art, glass making procedures of this type are known as vapor phase hydrolysis/oxidation processes, or simply as flame hydrolysis processes. The bulk fused silica body formed by the deposition of fused silica particles is often referred to as a "boule," and this terminology is used herein with the understanding that the term "boule" includes any silica-containing body formed by a flame hydrolysis process.

FIG. 1 shows a typical furnace 100 for producing fused silica glass. As shown in FIG. 1, furnace 100 includes a crown which carries plurality of burners which produce the silica soot which is collected on a collection surface 24 to form a boule 19, which typically has a diameter on the order of five feet (1.5 meters).

Boules typically having diameters on the order of five feet (1.5 meters) and thicknesses on the order of 5–10 inches (13–25 cm) can be routinely produced in large production furnaces of the type shown in FIG. 1. Multiple blanks are cut from such boules and used to make the various optical members referred to above. The optical axis of a lens element made from such a blank is generally parallel to the boule's axis of rotation in the furnace. For ease of reference, this direction will be referred to as the "axis 1" or "use axis".

In the past, burners 14 have been unable to deposit soot in a sufficient manner at distances greater than six inches from the burner face, which has meant that the maximum boule thickness has been six inches. Commonly assigned PCT patent application publication number WO 00/17115, the entire contents of which are incorporated herein by reference, describes a burner capable of producing boules having a thickness of 8–10 inches. The burner in this PCT application includes concentric regions emitting the following gases: 1) a central region (fume tube) which emits a mixture of a halide free silicon containing raw material and an inert gas, 2) an inner shield gas region which emits oxygen, 3) a third region which emits a mixture (premix) of combustible gas and oxygen, 4) a fourth region which emits a mixture (premix) of combustible gas and oxygen, 5) a fifth region which emits a mixture (premix) of combustible gas and oxygen, and 6) a sixth region, which is an outershield region which emits oxygen.

As noted in PCT patent application publication number WO 00/17115, burners that work well in one particular application (e.g., optical waveguide performs or smaller sized boules), or starting material (e.g., halide free starting materials versus halide containing materials), may not be successful in another application having different operating conditions. In the course of development of a furnace for producing high transmission fused silica boules, applicants surprisingly discovered that the burner described in PCT application publication number WO 00/17115 did not work particularly well in producing high transmission glass. Applicants found that this burner did not provide sufficient heat to the target surface onto which the glass was being deposited. Applicants attempted to increase the gas flows through the burner described in the PCT application, however, the flame velocity increased proportionally, creating flames with excessive force which forced heat and unconsolidated soot away from the target surface back towards the crown of the furnace. Applicants further discovered that over time, this soot built up and eventually formed droplets of fused glass which drip down onto the surface of the boule, requiring the furnace to be shut down.

The next generation of fused silica glass used in the microlithography market will require ArF (193 nm) internal transmission exceeding 99.65%/cm, and preferably greater than 99.75%/cm. As noted above, during the course of development of a process and a furnace capable of manufacturing such high transmission glass, applicants discovered the need for a burner to produce more heat at a velocity that would not create flames that caused the problems noted above.

SUMMARY OF INVENTION

The invention relates to methods and apparatus for producing fused silica. According to one aspect of the invention, a method for producing silica-containing boule is provided, which includes providing a furnace including a burner for producing soot in a flame disposed above a collection surface, the burner including at least seven gas-emitting regions. According to this aspect, the method further involves providing a mixture of a carrier gas and a silicon-containing material to a first region, providing oxygen to the second region, providing a mixture of combustible gas and oxygen to the third, fourth, fifth and sixth regions, providing oxygen to the seventh region, and collecting soot on the collection surface to form the boule. In another aspect of the invention, the second region surrounds the first region, the third region surrounds the second region, the fourth region surrounds the third region, the fifth region surrounds the fourth region, the sixth region surrounds the fifth region and the seventh region surrounds the sixth region. According to a preferred aspect of the invention, the velocity of the flame is controlled to enhance the efficiency of the collection step. According to another aspect of the invention, the boule has a thickness greater than ten inches.

Another aspect of the invention involves consolidating the boule during the collection step. Preferably, the silicon-containing precursor is halide free. According to another aspect of the invention, the distance between the burner and the collection surface remains constant during formation of the boule.

Another aspect of the invention relates to a fused silica member produced in accordance with the method described above. The fused silica member preferably has an internal transmission of at least 99.65%/cm, and preferably of at least 99.75%/cm at 193 nm.

Another aspect of the invention relates to a soot-producing burner comprising a burner face including first, second, third, fourth, fifth, sixth and seventh gas-emitting regions, wherein the first region emits a mixture of silicon-containing material and a carrier gas, the second region emits oxygen, the third, fourth, fifth, and sixth regions emit a mixture of combustible gas and oxygen, and the seventh region emits oxygen. In a preferred aspect, each of the gas emitting regions are concentrically disposed about the burner face. In a particularly preferred aspect, the second region surrounds the first region, the third region surrounds the second region, the fourth region surrounds the third region, the fifth region surrounds the fourth region, the sixth region surrounds the fifth region, and the seventh region surrounds the sixth region.

Still another aspect of the invention relates to apparatus for producing silica-containing soot. The apparatus comprises a burner having a face including a first region for emitting a silicon containing precursor and a carrier gas, two oxygen regions for emitting oxygen, and four mixture regions for emitting a mixture of combustible gas and oxygen. According to this aspect, the first region is disposed in a central region of the face, a first oxygen region surrounds the first region, the four mixture regions surround the first oxygen region, and a second oxygen region surrounds the four mixture regions. The apparatus further includes a supply of silicon containing precursor in communication with the first region and a supply of oxygen in communication with the two oxygen regions and the four mixture regions.

The invention provides the advantage of providing a high heat capacity burner that produces a low velocity flame that improves the manufacturing process for fused silica boules. Additional advantages of the invention will be set forth in the following detailed description. It is to be understood that both the foregoing general description and the following detailed description are exemplary and are intended to provide further explanation of the invention as claimed.

DETAILED DESCRIPTION

The present invention relates to methods and apparatus for producing fused silica, and more particularly fused silica boules. The fused silica can be high purity fused silica, or it may contain one or more dopants if desired. In accordance with the invention, high purity fused silica having internal transmission of at least 99.65%/cm at 193 nm can be produced using the methods and apparatus described herein.

Figure 1:
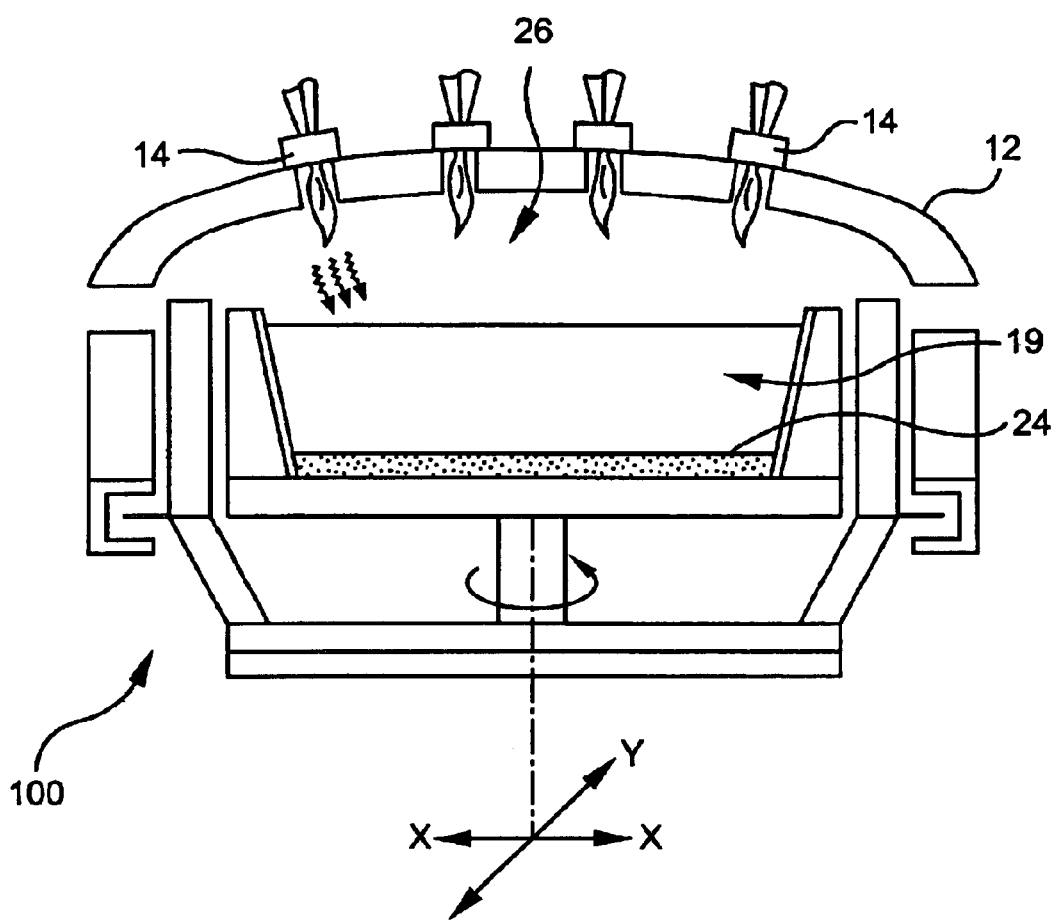
FIG. 1 is a schematic drawing illustrating the general type of furnace with which the burners of the invention can be used.
Figure 2:
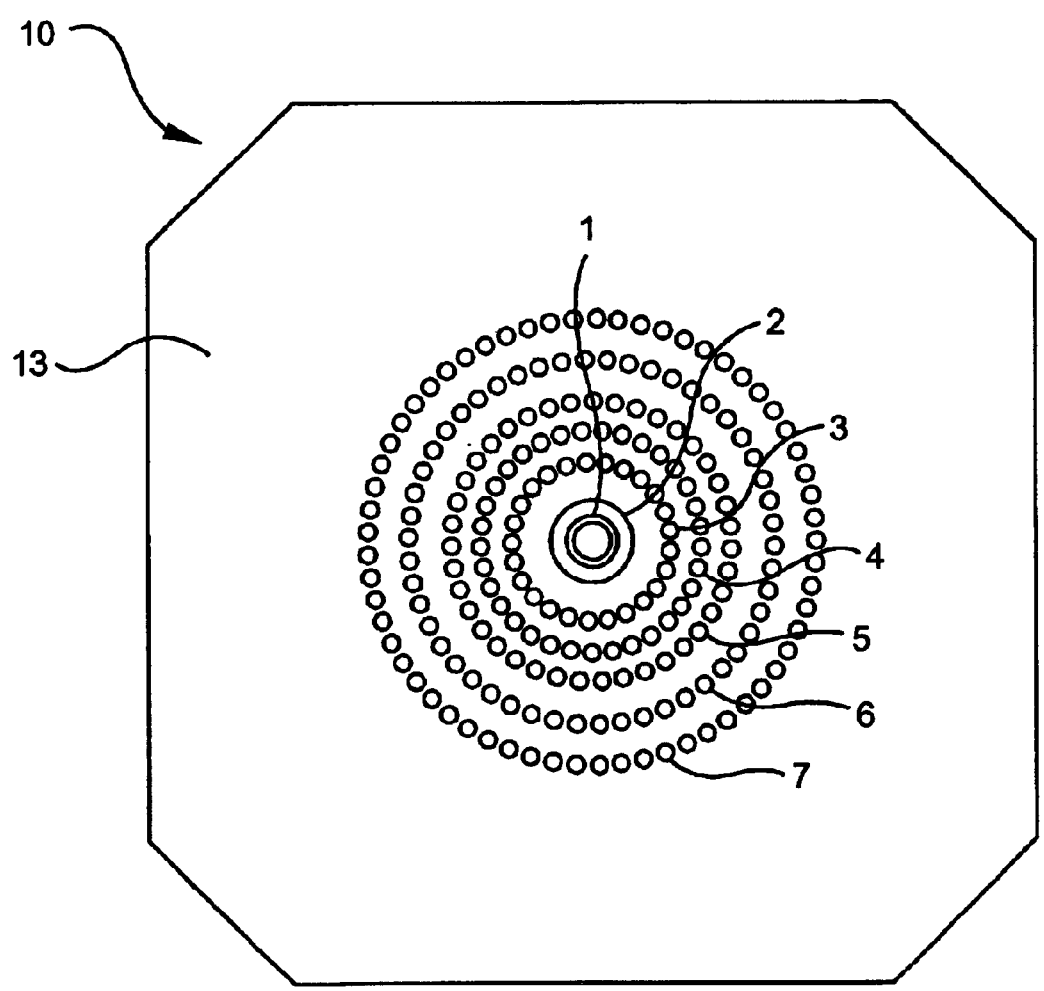
FIG. 2 is a schematic plan view of a burner face according to the invention.
Figure 3:
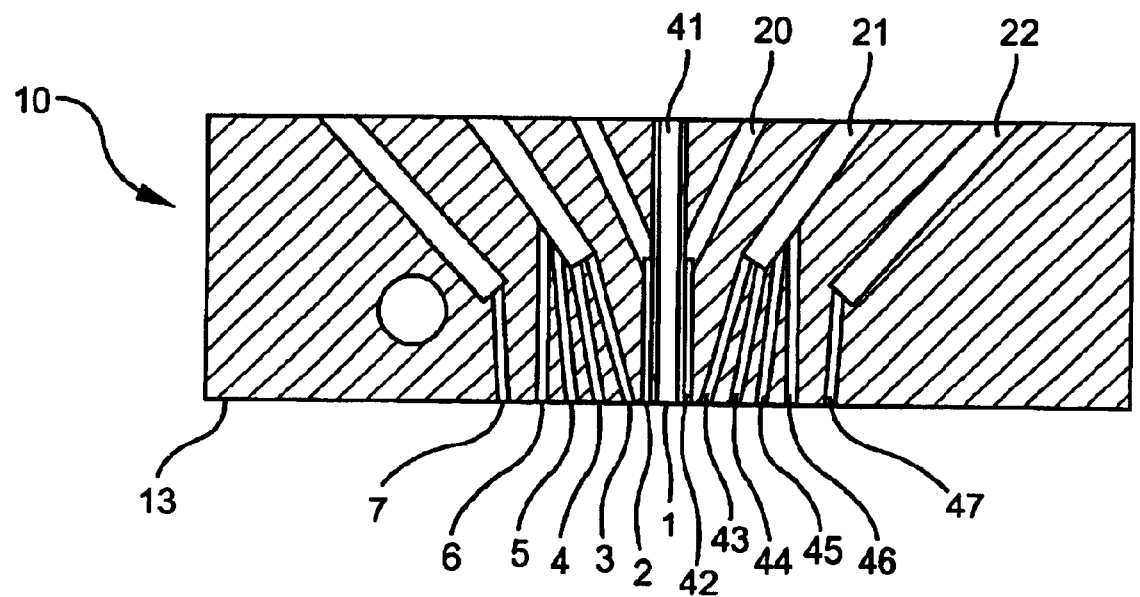
FIG. 3 is a cross-sectional view of the bottom portion of a burner constructed in accordance with the invention.

In accordance with one aspect of the invention, fused silica having improved internal transmission can be produced by providing a furnace as shown in FIG. 1 and a burner as shown in FIG. 2 and FIG. 3. The burners of the present invention can be used in other furnaces suitable for producing fused silica boules. For example, the burners may be used in the furnace shown and described in copending and commonly assigned the U.S. patent application entitled "Improved Methods and Furnace for Fused Silica Production," naming Floyd Marley, Dan Sempolinski and Merrill Sproul as inventors.

In a typical fused silica boule process, a process gas such as nitrogen is used as a carrier gas and a bypass stream of the nitrogen is introduced to prevent saturation of the vaporous stream. The vaporous reactant is passed through a distribution mechanism to the reaction site where a number of burners are present in close proximity to a furnace crown. The reactant is combined with a fuel/oxygen mixture at the burners and combusted and oxidized at a temperature greater than 1700° C. The high purity metal oxide soot and resulting heat is directed downward through the refractory furnace crown where it is immediately deposited and consolidated to a mass of glass on a hot bait collection surface contained on the table.

In one particularly useful embodiment of the invention, an optical member is formed by:
a) producing a gas stream containing a silicon-containing compound in vapor form capable of being converted through thermal decomposition with oxidation or flame hydrolysis to silica;
b) passing the gas stream into the flame of a combustion burner to form amorphous particles of fused silica;
c) depositing the amorphous particles onto a support; and
d) consolidating the deposit of amorphous particles into a transparent glass body.

Useful silicon-containing compounds for forming the glass blank preferably include any halide-flee cyclosiloxane compound, for example, polymethylsiloxane such as hexamethyldisiloxane, polymethylcyclosiloxane, and mixtures of these. Examples of particularly useful polymethylcyclosiloxane include octamethylcyclotetrasiloxane, decamethylcyclopentasiloxane, hexamethylcyclotrisiloxane, and mixtures of these.

In one particularly useful method of the invention, halide-free, cyclosiloxane compound such as octamethylcyclotetrasiloxane (OMCTS), represented by the chemical formula —[SiO(CH$_3$)$_2$]$_4$—, is used as the feedstock for the fused silica boule process, or in the vapor deposition processes such as used in making high purity fused silica for optical waveguide applications.

As practiced commercially, boules having diameters on the order of five feet (1.5 meters) and thicknesses on the order of 5–10 inches (13–25 cm) can be produced using furnaces of the type shown in FIG. 1. According to the present invention, however, it is possible to produce boules having a thickness up to twenty inches thick, particularly in a furnace shown and described in the copending patent application entitled, "Improved Methods and Furnace for Fused Silica Production," naming Floyd Marley, Dan Sempolinksi and Merrill Sproul as inventors, the entire contents of which are incorporated herein by reference.

FIGS. 2 and 3 show a burner 10 constructed in accordance with the present invention. The burner 10 includes a central region or first gas emitting region 1 which emits a mixture of a silicon-containing starting material and a carrier gas. Preferably, the carrier gas is a gas such as nitrogen. The burner 10 also includes an innershield or second gas emitting region 2 which emits oxygen. A third gas emitting region 3 emits a mixture of a combustible gas such as methane and oxygen. A fourth gas emitting region 4 emits a mixture of a combustible gas and oxygen. A fifth gas emitting region 5 and a sixth gas emitting region also emit a mixture of a combustible gas and oxygen. An outershield or seventh gas-emitting region 7 emits oxygen.

Referring to FIG. 3, channels 41, 20, 21 and 22, are connected to a series of complementary channels inside the burner 10, which in turn are connected to gas and reactant supplies (not shown). Construction of complementary channels and other internal details of the burner, such as, for example, baffles, may be found in PCT patent application publication number WO 00/17115. Channel 41 is in communication with a carrier gas supply and a supply of a silicon-containing raw material. Channel 20 is in communication with an oxygen supply and channel 21 is connected to supplies of oxygen and combustible gas. Channel 22 is connected to an oxygen supply. A suitable gas delivery system, e.g., including regulators, feed lines, gas mixers, metering pumps, flowmeters, heaters and vaporizers for vaporizing the silicon-containing raw material is used to provide the flow of the gases and raw material.

Channel 41 passes through the burner 10 and creates the first gas emitting region at burner face 13. Channel 20 communicates with conduit 42, which creates the burner's second gas emitting region 2 at the burner face 13. Channel 21 communicates with holes 43, 44, 45 and 46, which provide the burner's third, fourth, fifth and sixth gas emitting regions 3, 4, 5 and 6, respectively, at burner face 13. The holes 43, 44, 45 and 46 can be provided by suitable means such as drilling or by providing a continuous annulus. Channel 22 communicates with hole 46, which provides the burner's seventh gas emitting region.

Suitable flow rates for the materials used to make fused silica are as follows. The flow rate for octamethylcyclotetrasiloxane (OMCTS) may be between 5.5 and 14 grams/minute. The carrier gas or nitrogen flow rate may be between 3.5 and 6.4 slpm, and preferably between about 4.0 and 6.4 slpm. The innershield oxygen may be between 6 and 15 slpm, the premix oxygen may be between 20 and 60 slpm and premix methane may be between 20 and 40 slpm, and the outershield oxygen flow rate is between 10 and 30 slpm. Preferably, the flow rate for (OMCTS) is between 7.5 and 8.5 grams/minute. Preferably, the carrier gas or nitrogen flow rate is between 4.6 and 6.4 slpm. Preferably, the innershield oxygen is between 10 and 12 slpm, the premix oxygen is between 20 and 30 slpm and premix methane is between 18 and 25 slpm, and the outershield oxygen flow rate is between 12 and 18 slpm.

An advantage of the present invention is that the burner provides the ability to increase the heat output of the burner by up to at least 50% when compared with prior art burners. Another advantage of the present invention is the ability to increase the gas flow rates and the flow rate of the silicon-containing precursor to the burner without increasing the velocity of the flame. In addition, the flow rate of OMCTS can be increased to above 8 grams/minute without encountering any problems with glass quality such as, for example, seed formation in the glass produced by the burner.

Computational modeling of combustion from the burner has indicated that the burner of the present invention produces a flame that is at least 100° C. hotter near the center of the burner when the burner is positioned 8 inches from the deposition surface and at least 50° C. hotter near the center of the burner when the burner is positioned 10 inches from the deposition surface. Increased gas flows to the burner of the present invention resulted in a hotter flame without any deleterious effects associated with increasing the gas flows on prior art burners. In fact, velocity profile measurements near the radial center of the burner at a distance of four inches from the burner face showed that the velocity of the flame near the center of the burner was less than 25 m/s, and typically around 22 to 23 m/s. In prior art burners, typically the velocity of the flame at the center of the burner and at a distance of four inches from the burner face exceeded 26 to 27 m/s for the same gas flow rates. The momentum of the soot particles produced by the burner, which is a function of the mass of the particles multiplied by the velocity squared, is reduced by about 25–35% when compared to prior art burners using the same gas flows. Therefore, a reduced velocity burner flame provides reduces the momentum of soot particles and improves silica collection efficiency. Providing silica particles having less momentum as they move towards the collection surface prevents soot particles from being ejected from the collection surface of the furnace. In addition, the more "gentle" or "softer" flame prevents heat from being deflected away from the collection surface and towards the furnace crown.

It will be apparent to those skilled in the art that various modifications and variations can be made to the present invention without departing from the spirit or scope of the invention. Thus, it is intended that the present invention cover modifications and variations of this invention provided they come within the scope of the appended claims and their equivalents.

What is claimed is:

1. A method for producing silica-containing boule comprising the steps of:

providing a furnace including a burner for producing soot in a flame disposed above a collection surface, the burner including at least seven gas-emitting regions;

providing a mixture of a carrier gas and a silicon-containing material to a first region;

providing oxygen to the second region;

providing a mixture of combustible gas and oxygen to the third, fourth, fifth and sixth regions;

providing oxygen to the seventh region; and collecting soot on the collection surface to form the boule.

2. The method of claim 1, wherein the second region surrounds the first region, the third region surrounds the second region, the fourth region surrounds the third region, the fifth region surrounds the fourth region, the sixth region surrounds the fifth region and the seventh region surrounds the sixth region.

3. The method of claim 2, wherein the velocity of the flame is controlled to enhance the efficiency of the collection step.

4. The method of claim 3, wherein the boule has a thickness greater than ten inches.

5. The method of claim 4, further comprising the step of consolidating the boule during the collection step.

6. The method of claim 5, wherein the silicon-containing material is halide free.

7. The method of claim 1, wherein velocity of the flame at the center of the burner at a distance 4 inches from the burner face is 25 m/s.

8. The method of claim 4, wherein the distance between the burner and the collection surface remains constant during formation of the boule.

9. A fused silica member produced in accordance with the method of claim 1.

10. The fused silica element of claim 9, wherein the fused silica member has an internal transmission of at least 99.65% at 193 nm.

* * * * *